United States Patent [19]

Loser

[11] 4,224,849
[45] Sep. 30, 1980

[54] DEVICE FOR DETECTION OF METAL IN A MOVED STRAND

[75] Inventor: Karlheinz Loser, Karlsruhe, Fed. Rep. of Germany

[73] Assignee: Weisert, Loser & Sohn GmbH & Co., Fed. Rep. of Germany

[21] Appl. No.: 6,197

[22] Filed: Jan. 24, 1979

[30] Foreign Application Priority Data

Jan. 5, 1975 [DE] Fed. Rep. of Germany ....... 2900280

[51] Int. Cl.³ .............................................. B65G 47/34
[52] U.S. Cl. ........................................ 83/80; 83/104; 83/106; 83/157; 83/371
[58] Field of Search .................... 83/79, 80, 104, 106, 83/371, 157

[56] References Cited
U.S. PATENT DOCUMENTS

| 2,309,343 | 1/1943 | Farrow | 83/371 X |
| 3,560,123 | 2/1971 | Sekino et al. | 83/371 X |

Primary Examiner—J. M. Meister
Attorney, Agent, or Firm—Craig & Antonelli

[57] ABSTRACT

A device is provided for detection of metal in a moved strand of a highly viscous material such as a mass of chewing gum. A guide trough for the strand is provided, above which an electronic metal detector is disposed, whereby a drop knife is disposed above the guide trough, and a swing valve opens into the floor of the guide trough.

9 Claims, 2 Drawing Figures

DEVICE FOR DETECTION OF METAL IN A MOVED STRAND

BACKGROUND AND SUMMARY OF THE INVENTION

The present invention relates to a device that is intended for detection of metal in a moved strand of highly viscous material, with a guide trough for the strand, above which an electronic metal detector is disposed.

The new device is suitable for monitoring endless strands of a product made of a viscous mass, for the presence of metal, and it finds particular application in the food industry, where such strands, e.g. a mass of chewing gum or dough, have to be examined for the presence of small metallic particles before further processing. Such metallic particles appear preponderantly from rubbing off the processing machinery into the material, and it is absolutely necessary to remove them from the material strand.

The use of electronic metal detectors for detecting metallic particles in strands of highly viscous material is known. The strand of material is passed below the detector in a guide trough, and as soon as the detector responds to a metallic part, a signal is given. On the basis of this optical and/or acoustic signal, the operator manually separates the strand, removes the part that contains the metal piece and leads the running strand further, to the next processing devices, e.g. cutting and packaging machines. This method is associated with high outlay for wages however, and also there is a certain factor of unreliability.

It is a problem of the present invention, to automate and rationalize the removal of strand pieces that contain metallic particles in the production of high-viscosity material in the form of endless strands.

To solve this problem, the basis is a device of the mentioned type and the solution lies in that a drop knife is disposed above the guide trough and a swing valve is let into the floor of the guide trough. With use of this drop knife, it is possible automatically to cutout the parts of the strand in which the metal detector has detected metal pieces, said parts of the strand then falling out below when the swing valve is opened, from the guide trough, and thereby they can be carried off. This process is reliable, economical and—since there is no manual operation—it is also absolutely hygienic.

Advantageously a hold-down device is provided on the drop knife, in preferred embodiments, so that there will be a sure separation of the strand.

Advantageously there is at least one compression spring seated between the hold-down device and the drop knife. By this arrangement, differences in thickness of the strand are balanced out.

According to a further feature of certain preferred embodiments of the invention, the swing axis of the swing plate is disposed at a distance from the edge of the swing plate. This arrangement has the effect that when the swing valve is open, its rearward part will lie in the path of the strand, whereby the strand will be deflected into the floor opening laid open by the swing valve.

In order to have an acceptable advance of the strand in the region of the device, part of the guide trough floor is formed by a conveyor belt in preferred embodiments of the invention.

A conveyor belt is disposed below the swing valve and crosswise to the guide trough, to carry away the cutout section of strand in accordance with yet another feature of preferred embodiments of the invention.

A cylinder-piston assembly driven by pressure means engages respectively on the drop knife and the swing valve in accordance with preferred embodiments.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE DRAWINGS

Figure 1:
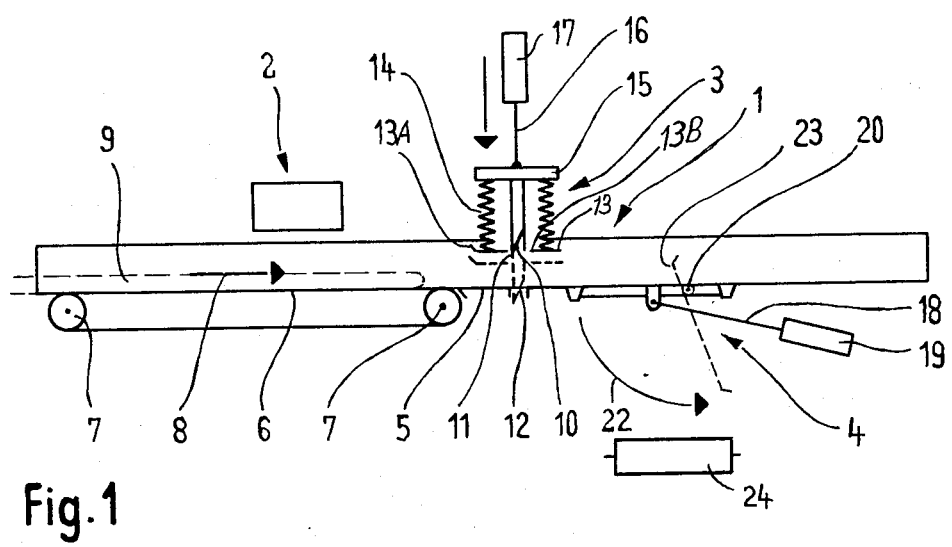
FIG. 1 is a schematic longitudinal sectional view which shows a device with a metal detector, a drop knife and a swing valve constructed in accordance with a preferred embodiment of the invention.

A device for detection of metal in a moved strand comprises—see FIG. 1—essentially a guide trough 1, a metal detector 2, a drop knife 3 and a swing valve 4.

The straight guide trough 1 has an upwardly open U-shaped cross section. Part of its floor 5 is constituted by a conveyor belt 6 that runs on two cylindrical or slightly rounded rolls 7 and is moved in the direction of arrow 8 by a drive that is not illustrated. As indicated by dashed lines, the beginning of a strand 9 lies on conveyor belt 6, delivered from conveyor 6 to drop knife 3 and swing valve 4.

Above guide trough 1 there is a metal detector 2. This is a known electronic instrument that responds to very small metallic particles. Each metallic particle in the strand instantaneously triggers a pulse in metal detector 2, which is utilized for control of drop knife 3 and swing valve 4.

The flat rectangular drop knife 3 is disposed above guide trough 1, to its long direction. Cutting edge 11 which goes over into a slant 10 penetrates in the lower position of drop knife 3 through a slit 12 in floor 5 of guide trough 1, to effect acceptable separation of strand 9. A hold-down device 13 in the form of a flat plate is provided on drop knife 3, the forward edge 13A of said plate being deflected upward. Hold-down devide 13 presents a transverse slit 13B through which drop knife 3 strikes. There are two compression springs 14 between hold-down device 13 and drop knife 3, and a beam 15 fixed to the head of drop knife 3 engages piston rod 16 of a cylinder-piston assembly 17 which is driven by pressure means. The device is so arranged that when drop knife 3 moves downward, hold-down device 13 presses on the upper side of strand 9 because of the force of springs 14, and holds the said strand during the cutting process.

Swing valve 4 is disposed closely behind drop knife 3 in the floor 5 of guide trough 1. Piston rod 18 of another cylinder-piston assembly 19 is connected to the underside of swing valve 4, said rod holding swing valve 4 in its inoperative position as illustrated in FIG. 1. Swing valve 4 (see also FIG. 2) is swingable about a shaft 20 which is disposed crosswise to the long direction of trough 1, said shaft being located at a distance 21 which amounts to about ¼ to ⅓ the length of valve 4 from the edge of said valve. If cylinder-piston assembly 19 is acted on by its pressure medium—advantageously compressed air—swing valve 4 then swings by an angle of about 120° downward, as indicated by arrow 22, into the operative position indicated by dashed lines in FIG. 1, where its rearward part 23 which extends beyond shaft 20 is inclined upward against the direction of travel of strand 9. This high-standing part 23 ensures that the beginning of strand 9, after drop knife 3 has moved upward, will be led through the opening in floor 5 that is opened by swing valve 4. This beginning of separated strand 9 reaches a conveyor belt 24 which is crosswise to guide trough 1.

Figure 2:
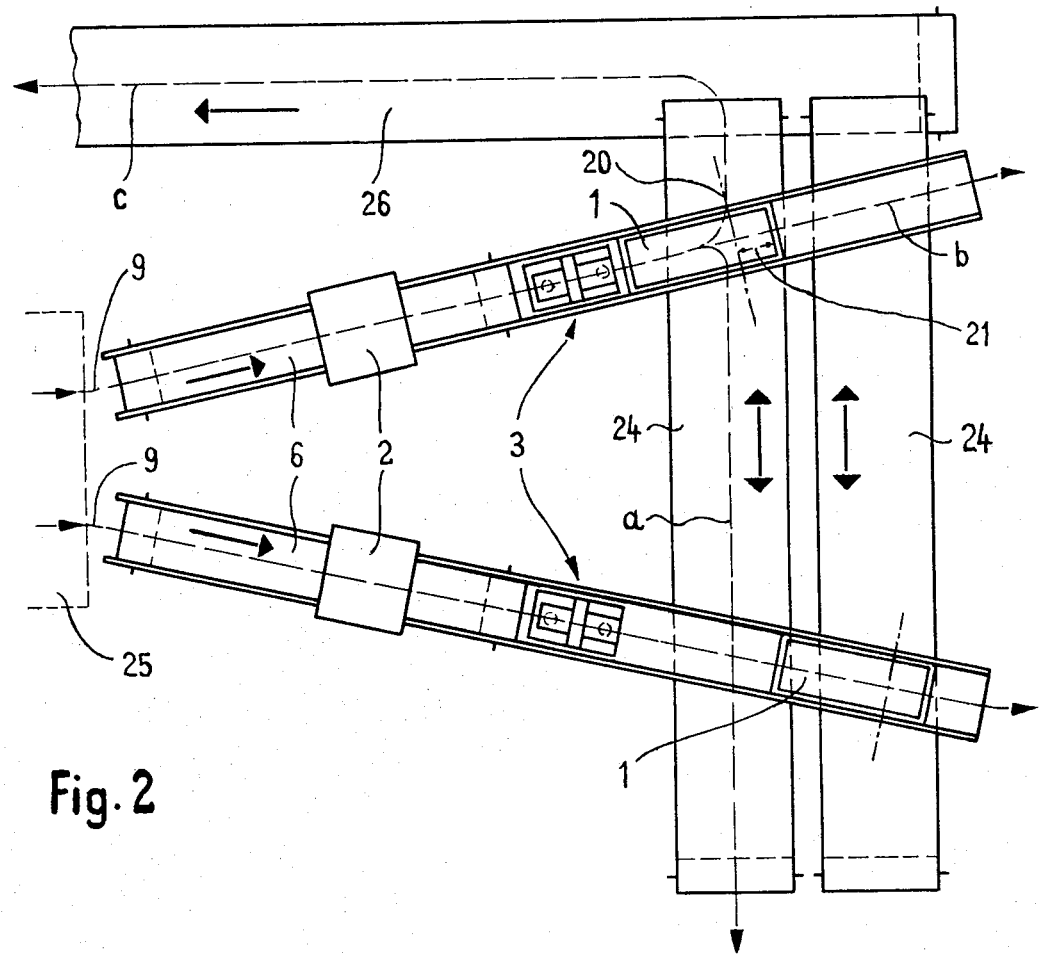
FIG. 2 is a schematic top view which shows two devices according to FIG. 1, disposed next to each other at the output of a cooling tunnel, with two conveyor belts as well as a back-conveyor, arranged in accordance with a preferred embodiment of the invention.

In FIG. 2, two devices of FIG. 1 are shown disposed at the output of a cooling tunnel 25, from which two independent strands 9 of a highly viscous material issue, e.g. chewing gum. Each strand 9 runs via the respective conveyor belt 6 below metal detector 2 and drop knife 3 and arrives on a table (not illustrated) which serves as a "buffer", over swing valve 4 which is in its inoperative position: from this table strands 9 run into a cutting and packaging machine. The two conveyor belts can be coupled with the drive of cooling tunnel 25, which entails conformity of speed of movement of strands 9.

Every time a metallic particle triggers a pulse in metal detector 2, drop knife 3 and swing valve 4 are thereby actuated. Strand 9, issuing from cooling tunnel 25, is separated and the strand part that contains the metallic particles runs through swing valve 4 which is swung down, via conveyor 24, into a hopper, as indicated in FIG. 2 by dashed line a. After separation has been effected in this way, of a predetermined portion of the strand, drop knife 3 is automatically actuated a second time and swing valve 4 is swung back into its (horizontal) inoperative position, so that running strand 9 is once more taken to the buffer table, see dashed line b.

The device is likewise activated if there is some hindrance in one of the cutting and packaging machines. In such a case for example, a monitoring device disposed above the buffer table triggers a control pulse that actuates drop knife 3 (or both drop knives) and swing valve 4 and controls the appurtenant conveyor belt 24, so that it moves in the direction of a back-conveyor 26 (dashed line c) under the two conveyor belts 24. In this way the strand 9 will be taken to the entrance of cooling tunnel 25 and there into an extruder until the hindrance in question has been eliminated.

While I have shown and described a single embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:
1. Device for detecting and removing metal from a moving strand of highly viscous material, such as gum or the like, comprising:
   a guide trough for the strand,
   an electronic metal detector for detecting metal in the strand as it moves along the guide trough,
   a drop knife disposed above the guide trough,
   control means for actuating said drop knife to sever said strand in response to detection of metal in the strand by the metal detector,
   and swing valve means opening into the floor of said guide trough for accommodating removal of the severed strand with metal therein.
2. Device according to claim 1, wherein a hold-down device is provided on the drop knife.
3. Device according to claim 2, wherein at least one compression spring is seated between the hold-down device and the drop knife.
4. Device according to claim 1, wherein the swing valve is mounted for pivotal movement about a swing shaft located at a distance from the rear edge of the swing valve.
5. Device according to claim 4, wherein said distance is between ⅓ and ¼ of the length of the swing valve in the travel direction of the strand.
6. Device according to claim 1, wherein part of the floor of the guide trough is constituted by a conveyor belt.
7. Device according to claim 1, wherein a conveyor belt is disposed below the swing valve crosswise to the guide trough.
8. Device according to claim 1, wherein a cylinder-piston assembly operatively engages the drop knife.
9. Device according to claim 1, wherein a cylinder-piston assembly operatively engages the swing valve.